June 1, 1965 A. G. STIMSON 3,186,320
EXPOSURE CONTROL SYSTEM FOR PHOTOGRAPHIC CAMERAS
Filed Jan. 14, 1963

ALLEN STIMSON
INVENTOR.

BY R. Frank Smith
Robert W. Hampton
ATTORNEYS

United States Patent Office 3,186,320
Patented June 1, 1965

3,186,320
EXPOSURE CONTROL SYSTEM FOR PHOTOGRAPHIC CAMERAS
Allen G. Stimson, Rochester, N.Y., assignor to Eastman Kodak Company, Rochester, N.Y., a corporation of New Jersey
Filed Jan. 14, 1963, Ser. No. 251,231
4 Claims. (Cl. 95—10)

The present invention relates to photographic cameras and more particularly concerns improved photoelectric exposure control systems for such cameras.

An object of this invention is to adjust an exposure regulating device in a camera in conjunction with adjustment of the position of the permanent magnet of an exposure meter, whereby the deflection of a pointer in the meter is regulated to apprise the camera operator of proper adjustment of the camera for an existing field brightness.

Another object of the invention is to provide a simple, inexpensive and convenient means for adjusting a camera to compensate for variations in field brightness.

Other objects of the invention will appear from the following description, reference being made to the accompanying drawings, wherein.

Figure 1:
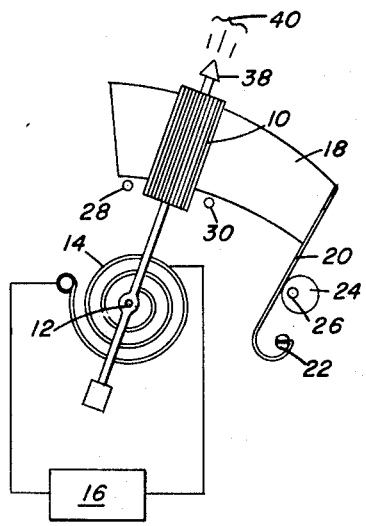
FIG. 1 is a front view of one embodiment of the invention.

Referring to FIG. 1, a coil 10 of an electric measuring instrument is pivoted at 12 and is urged counterclockwise by springs such as 14. Coil 10 is energized through springs such as that illustrated at 14, or under control of a photocell 16, illustrated as a photovoltaic cell, which in turn is energizable by field light. The coil cooperates with a permanent magnet 18 mounted on a leaf spring 20, which is secured to a fixed post 22. Spring 20 cooperates with a cam 24 mounted on an axis 26. When cam 24 is turned, as described below, it positions spring 20 and therefore magnet 18, which is guided by a pair of pins 28 and 30 that act also as limit stops for coil 10.

Figure 2:
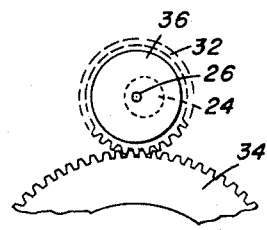
FIG. 2 illustrates a typical coupling between the adjusting cam and the exposure regulating device, in accordance with the invention.

Cam 24 is coupled to an exposure regulating device, such as a diaphragm ring or shutter speed ring, for example by means of a gear 32 (FIG. 2) integral with the cam and meshing with the toothed periphery of the exposure regulating device, illustrated at 34. A knob 36, accessible to the camera operator, is integral with cam 24 and is employed for manually turning that cam about its axis.

When the camera is directed at a scene that is to be photographed, photocell 16 energizes coil 10 in accordance with field brightness. A magnetic field thus generated in the coil cooperates with the field of the permanent magnet 18 and deflects the coil clockwise against the tension of spring 14. The camera operator adjusts the position of cam 24, thereby adjusting the position of magnet 18 and the setting of the exposure regulating device 34, until the permanent magnet assumes a new position such that spring 14, in opposition to the combined magnetic fields, moves the coil to some predetermined reference position representing a desired exposure of film in the camera. Conveniently, this position can be identified by the camera operator by viewing the alignment of a pointer 38 with one or more index marks 40.

Three such index marks, as illustrated in the drawings, facilitate adjustment of the camera for a deliberate underexposure or overexposure relative to a predetermined nominal exposure.

Figure 3:
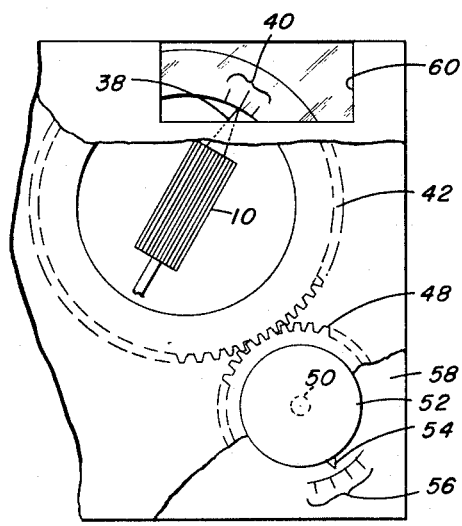
FIG. 3 is a front view of a second embodiment of the invention.

FIGURE 3 illustrates the carrying of index marks 40 by a member 42 angularly movable in accordance with an additional exposure factor such as film sensitivity. Member 42 is illustrated as a toothed ring meshing with a gear 48, which is pivoted about an axis 50. A knob 52 is integral with gear 48 and is accessible to the camera operator for adjusting gear 48, ring 42 and therefore the position of index marks 40. A pointer 54 on knob 52 cooperates with a scale 56, which is carried by the camera cover 58 and is graduated in units of the additional exposure factor. Conveniently, index marks 40 are viewed through a viewfinder or other window 60 in the camera cover.

The invention has been described in detail with particular reference to preferred embodiments thereof, but it will be understood that variations and modifications can be effected within the spirit and scope of the invention as described hereinabove and as defined in the appended claims.

I claim:

1. In a camera having an adjustable exposure regulating device, an exposure control system comprising, in combination: a photoelectric cell illuminatable by field light; an electric measuring instrument having a movable coil connected to and energizable by said photocell to generate a first magnetic field as a function of field brightness; a permanent magnet generating a second magnetic field interacting with said first magnetic field for positioning said coil within a predetermined path inside said coil in accordance with the energization of said coil; means for adjusting the position of said magnet for correspondingly adjusting the position of said coil; means for adjusting said exposure regulating device in conjunction with adjustment of the position of said magnet; and index means movable with said coil for identifying, by the position thereof, the proper adjustment of said exposure regulating device to achieve a predetermined exposure of film in said camera.

2. The exposure control system defined in claim 1, wherein said coil is pivotally mounted, said permanent magnet is mounted on a leaf spring, and said exposure regulating device is coupled to a cam cooperating with said leaf spring for adjusting the position of said magnet in accordance with the adjustment of said regulating device.

3. The exposure control system defined in claim 1, with a member adjustable as a function of an additional exposure factor, said member carrying index means cooperating with said first-named index means.

4. The exposure control system defined in claim 1, wherein said camera has a viewfinder and said index means is visible in said viewfinder.

References Cited by the Examiner
UNITED STATES PATENTS

| | | | |
|---|---|---|---|
| 2,194,152 | 3/40 | Riszdorfer | 95—10 |
| 2,953,978 | 9/60 | Rentschler | 95—10 |
| 2,968,227 | 1/61 | Melle | 95—10 |

NORTON ANSHER, *Primary Examiner.*
EMIL G. ANDERSON, *Examiner.*